(12) United States Patent
Petty

(10) Patent No.: US 11,603,154 B2
(45) Date of Patent: Mar. 14, 2023

(54) BICYCLE SADDLE ADJUSTMENT SYSTEM AND METHOD

(71) Applicant: Jon Petty, St. George, UT (US)

(72) Inventor: Jon Petty, St. George, UT (US)

(*) Notice: Subject to any disclaimer, the term of this patent is extended or adjusted under 35 U.S.C. 154(b) by 239 days.

(21) Appl. No.: 16/837,644

(22) Filed: Apr. 1, 2020

(65) Prior Publication Data
US 2020/0307730 A1 Oct. 1, 2020

Related U.S. Application Data

(60) Provisional application No. 62/827,580, filed on Apr. 1, 2019.

(51) Int. Cl.
*B62J 1/00* (2006.01)
*B62J 1/10* (2006.01)
*B62J 1/08* (2006.01)
*B62J 1/20* (2006.01)

(52) U.S. Cl.
CPC ............. *B62J 1/10* (2013.01); *B62J 1/005* (2013.01); *B62J 1/007* (2013.01); *B62J 1/08* (2013.01); *B62J 1/20* (2013.01)

(58) Field of Classification Search
CPC ..... B62J 1/10; B62J 1/005; B62J 1/007; B62J 1/08; B62J 1/20
USPC ............ 297/195.12, 195.13, 201, 202, 297/215.13–215.15
See application file for complete search history.

(56) References Cited

U.S. PATENT DOCUMENTS

| 629,956 | A | * | 8/1899 | Craig | B62J 1/005 |
| | | | | | 297/201 |
| 872,124 | A | | 11/1907 | Hammaren | |
| 4,429,915 | A | * | 2/1984 | Flager | B62J 1/26 |
| | | | | | 297/195.1 |
| 4,983,063 | A | * | 1/1991 | Phillips | B62J 1/08 |
| | | | | | 403/4 |
| 5,352,016 | A | * | 10/1994 | Hobson | B62J 1/005 |
| | | | | | 297/201 |
| 6,019,422 | A | * | 2/2000 | Taormino | B62J 1/04 |
| | | | | | 297/195.1 |
| 6,402,236 | B1 | * | 6/2002 | Yates | B62J 1/005 |
| | | | | | 297/201 |
| 6,626,490 | B2 | | 9/2003 | Williams et al. | |

(Continued)

FOREIGN PATENT DOCUMENTS

CN     110435791 A  * 11/2019
DE  202010005192 U1    9/2010

(Continued)

OTHER PUBLICATIONS 1 page PDF of translation of WO2013135697. (Year: 2013).*

*Primary Examiner* — Robert Canfield
(74) *Attorney, Agent, or Firm* — Gurr Brande & Spendlove, PLLC; Robert A. Gurr

(57) ABSTRACT

A bicycle saddle adjustment system has a base having one or more adjustment channels therein, and a first and second saddle for coupling to the base, the first and second saddle laterally adjustable via the one or more adjustment channels in the base. The bicycle saddle adjustment system may further have a removably attachable adapter that allows for a quick fitment between various saddles and the bicycle, the adapter allowing for temporary or permanent attachment to the base.

7 Claims, 22 Drawing Sheets

(56) References Cited

U.S. PATENT DOCUMENTS

| | | | |
|---|---|---|---|
| 7,841,654 B1 * | 11/2010 | Cardana | B62J 1/08 297/195.11 |
| 10,118,658 B2 | 11/2018 | Petty | |
| 10,717,485 B2 * | 7/2020 | Hight | B62J 1/08 |
| 10,750,872 B2 | 8/2020 | Petty | |
| 2009/0189421 A1 | 7/2009 | Yu et al. | |
| 2010/0308628 A1 * | 12/2010 | Hsu | B62J 1/08 297/215.14 |
| 2011/0221245 A1 * | 9/2011 | Kim | B62K 19/36 297/215.15 |
| 2012/0181824 A1 * | 7/2012 | Hsu | B62J 1/08 297/215.15 |
| 2012/0292959 A1 | 11/2012 | Sajonia | |
| 2013/0207424 A1 * | 8/2013 | Choi | B62J 1/00 297/215.15 |
| 2014/0308071 A1 * | 10/2014 | Darley | B62J 1/08 403/322.4 |
| 2017/0274950 A1 | 9/2017 | Holt et al. | |
| 2018/0146741 A1 * | 5/2018 | Martin | A43B 5/14 |
| 2019/0069679 A1 * | 3/2019 | Petty | B62J 1/005 |
| 2019/0084636 A1 * | 3/2019 | Blyer | B62J 1/08 |

FOREIGN PATENT DOCUMENTS

| | | | | |
|---|---|---|---|---|
| EP | 2052955 A2 * | 4/2009 | | B62J 1/00 |
| EP | 2147849 A2 * | 1/2010 | | B62J 1/00 |
| WO | WO-9311025 A1 * | 6/1993 | | B62J 1/10 |
| WO | WO-2013135697 A1 * | 9/2013 | | B62J 1/005 |
| WO | WO-2015193785 A1 * | 12/2015 | | B62J 1/00 |
| WO | WO-2020206031 A1 * | 10/2020 | | B62J 1/08 |

* cited by examiner

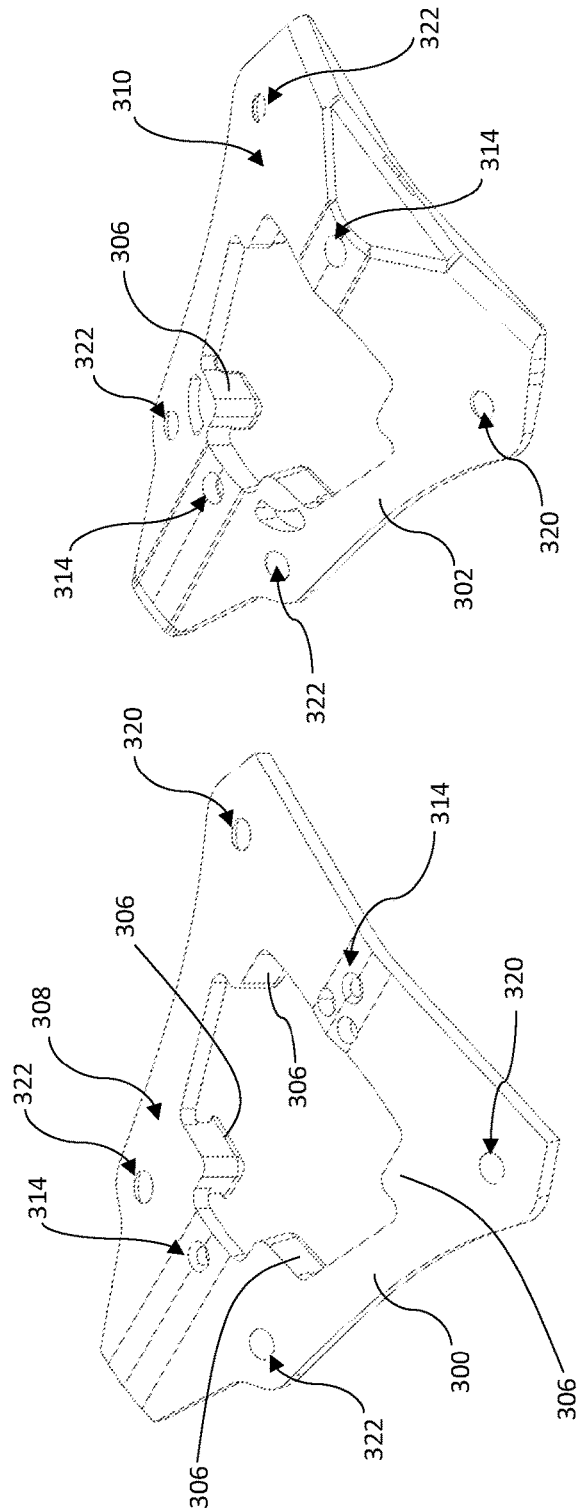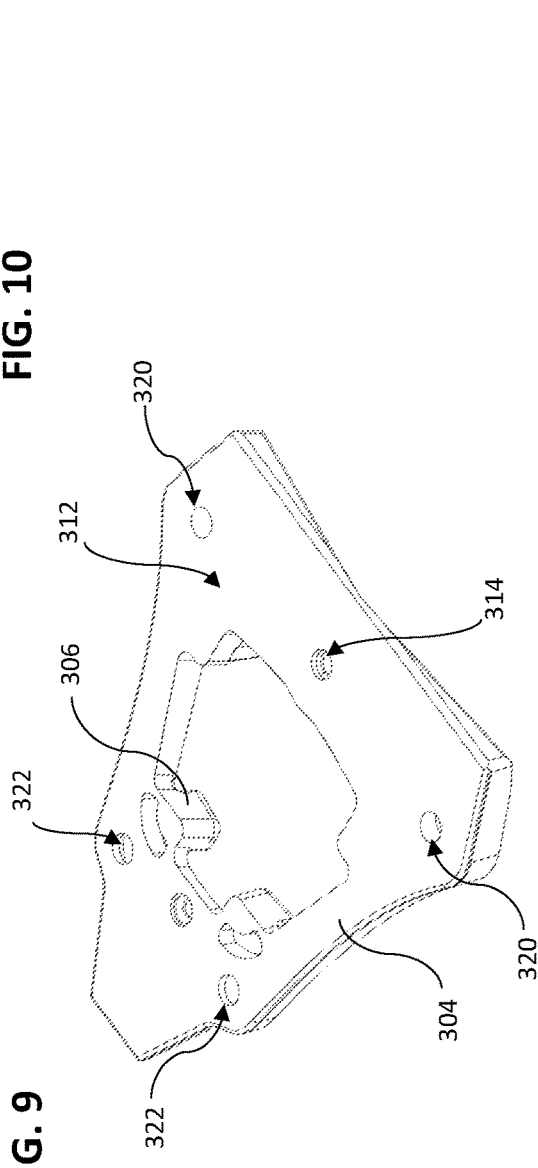

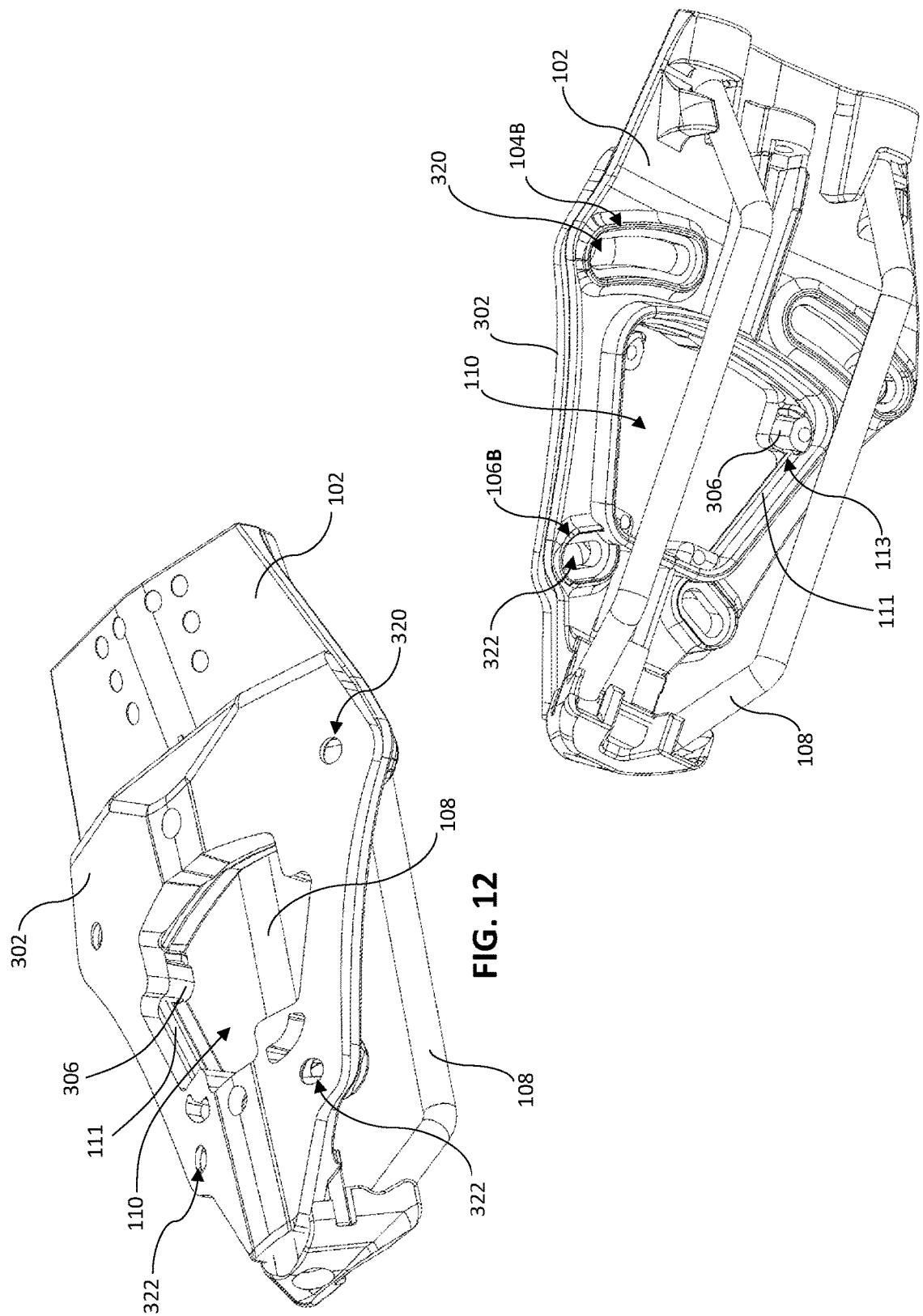

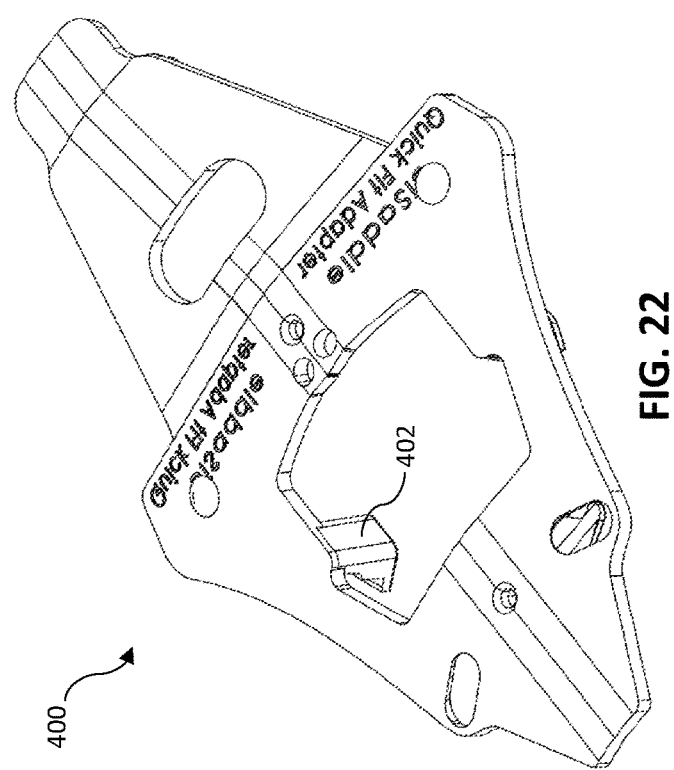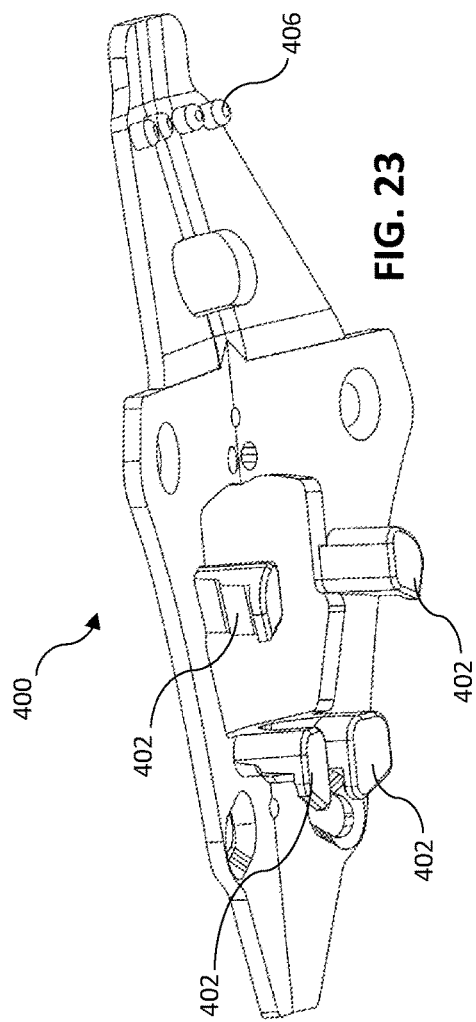

BICYCLE SADDLE ADJUSTMENT SYSTEM AND METHOD

CROSS-REFERENCE TO RELATED APPLICATIONS

This application claims the benefit of U.S. Provisional Application Ser. No. 62/827,580, filed on Apr. 1, 2019, which is incorporated herein by reference.

TECHNICAL FIELD

The present disclosure relates to bicycle saddles. More particularly, the present disclosure relates to customizable bicycle saddles and a system and method of a quick fit frame adapter for a bicycle saddle that allows for customizable adjustment by a user.

BACKGROUND

Bicycle saddles, or seats, are produced in a variety of shapes and sizes. Many are adjustable, allowing for correct positioning based upon a user's preference. However, most adjustments are made by a shop, not by a user. Due to the voluminous saddles and options, fitting a saddle to a user is time consuming. This is compounded by the fact that each saddle must be fastened to, and removed from, the bike each time an adjustment is desired. Because saddles are not meant to be easily removed, this process adds additional time. An adjustment at a shop can be rushed because of the above circumstances and because of the number of customers needing adjustments. This can lead to a user never having a precise saddle fitting. When a bicycle saddle does not properly fit a user, it is uncomfortable and can shorten riding time and lead to frustration.

In an attempt to overcome these issues, quick-release brackets have been introduced into the art. However, due to the expense and weight of the bracket, the bracket is not used on the end-user's bike. In other words, the bracket is used on a bike in the shop to find the best saddle for a user. Once the saddle is found, the saddle must then still be secured to the user's bike, which may alter the initial fitting. Even having minor movements after finding an ideal saddle position for a user can cause an improper fit and a lack of comfort. It is important that minute adjustments on a saddle are permanently held or known for a user's comfort. Whether it is a stationary bicycle for training or a bicycle for the trails, most quick-release brackets are cumbersome and create frustration for a user. Saddles are not one size fits all, which creates a need for adjustable saddles that are easy to attach and detach.

Accordingly, there is a need in the art for a bicycle saddle that allows quick and easy replacement and adjustment on a bicycle, without being too bulky and difficult to operate. The present disclosure seeks to solve these problems and others.

SUMMARY OF EXAMPLE EMBODIMENTS

In one embodiment, a bicycle saddle adjustment system comprises a base having one or more adjustment channels therein, and a first and second saddle for coupling to the base, the first and second saddle laterally adjustable via the one or more adjustment channels in the base.

In one embodiment, a bicycle saddle adjustment system comprises a base, a removably attachable adapter, and a first and second saddle. The adapter allows for a quick fitment between various saddles and the bicycle, the adapter allowing for temporary attachment to the base.

In one embodiment, a bicycle saddle adjustment system comprises an adjustment bar that controls adjustment using predetermined apertures, the adjustment bar fitting within the adjustment channels of the base.

In one embodiment, a traditional bike saddle comprises a removably attachable adapter which allows a user the ability to remove and attach any type of bicycle saddle.

BRIEF DESCRIPTION OF THE DRAWINGS

FIG. 9 a top, rear perspective view of a quick-fit adapter of a bicycle saddle adjustment system;

FIG. 10 a top, rear perspective view of a quick-fit adapter of a bicycle saddle adjustment system;

FIG. 11 a top, rear perspective view of a quick-fit adapter of a bicycle saddle adjustment system;

FIG. 12 illustrates a top, front perspective view of a quick-fit adapter coupled to a base of a bicycle saddle adjustment system;

FIG. 13 illustrates a bottom, left side perspective view of a quick-fit adapter coupled to a base of a bicycle saddle adjustment system;

FIG. 22 illustrates a top, front perspective view of a quick-fit adapter of a bicycle saddle adjustment system;

FIG. 23 illustrates a bottom, left perspective view of a quick-fit adapter of a bicycle saddle adjustment system;

DETAILED DESCRIPTION OF EXAMPLE EMBODIMENTS

Figure 1:
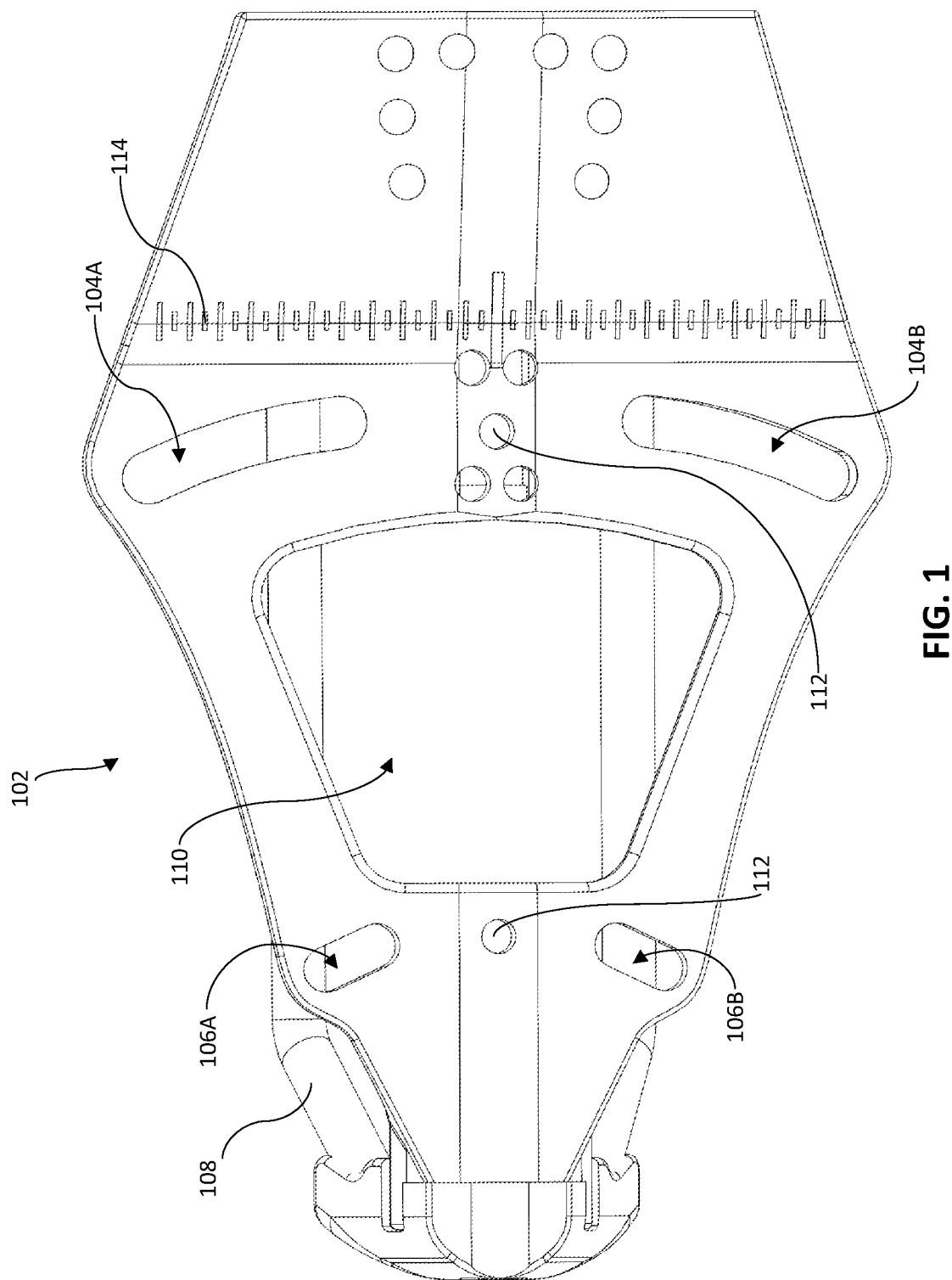
FIG. 1 illustrates a top plan view of a base of a bicycle saddle adjustment system.

The following descriptions depict only example embodiments and are not to be considered limiting in scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in one embodiment," or "in an embodiment," do not necessarily refer to the same embodiment, although they may.

Reference to the drawings is done throughout the disclosure using various numbers. The numbers used are for the convenience of the drafter only and the absence of numbers in an apparent sequence should not be considered limiting and does not imply that additional parts of that particular embodiment exist. Numbering patterns from one embodiment to the other need not imply that each embodiment has similar parts, although it may.

Accordingly, the particular arrangements disclosed are meant to be illustrative only and not limiting as to the scope of the invention, which is to be given the full breadth of the appended claims and any and all equivalents thereof. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. When used herein to join a list of items, the term "or" denotes at least one of the items, but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed processes or methods generally may be carried out in various sequences and arrangements while still falling within the scope of the present invention.

The term "coupled" may mean that two or more elements are in direct physical contact. However, "coupled" may also mean that two or more elements are not in direct contact with each other, but yet still cooperate or interact with each other.

The terms "comprising," "including," "having," and the like, as used with respect to embodiments, are synonymous, and are generally intended as "open" terms (e.g., the term "including" should be interpreted as "including, but not limited to," the term "having" should be interpreted as "having at least," the term "includes" should be interpreted as "includes, but is not limited to," etc.).

As previously discussed, there is a need in the art for a bicycle saddle that allows quick and easy adjustment for a user, and that further allows quick and easy replacement and adjustment on a bicycle, without being too bulky and difficult to operate. The bicycle saddle adjustment system disclosed herein solves these needs and others.

Briefly, the bicycle saddle adjustment system allows a user to quickly find a proper fit. The bicycle saddle adjustment system comprises a base allowing each saddle of a two-piece saddle to be adjusted independently. Once the ideal position is found, the saddles are secured in place using bolts or similar locking means. In some settings, such as a shop that provides saddle fitment, it may be ideal to have several saddles at differing adjusted positions available for a user to quickly try. Accordingly, an adapter is disclosed herein that allows for the quick attachment and detachment of saddles to find ideal fitment. The adapter may also be used with one-piece saddles if a user is interested in a one-piece saddle.

Figure 2:
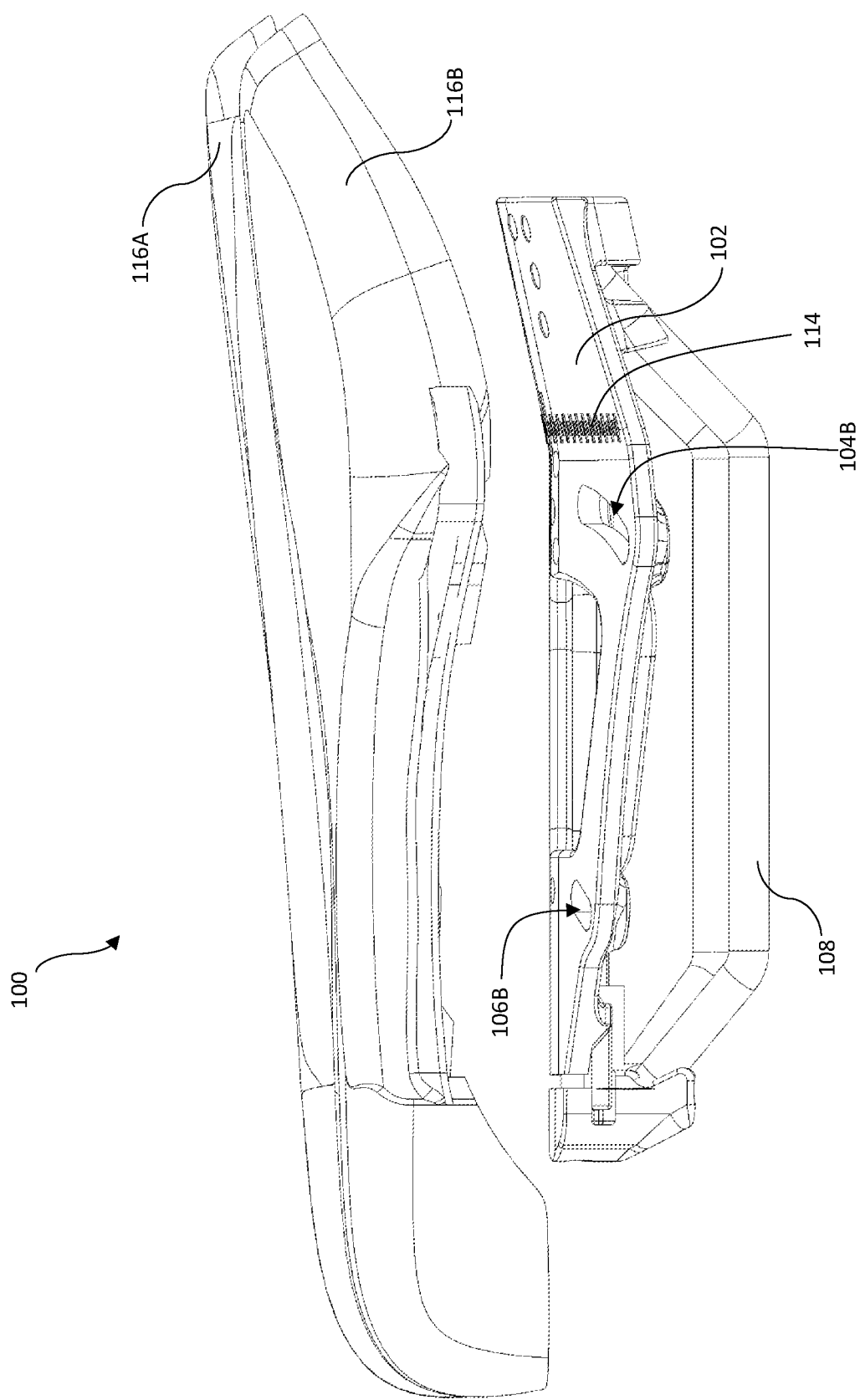
FIG. 2 illustrates a side elevation view of a decoupled bicycle saddle adjustment system.
Figure 3:
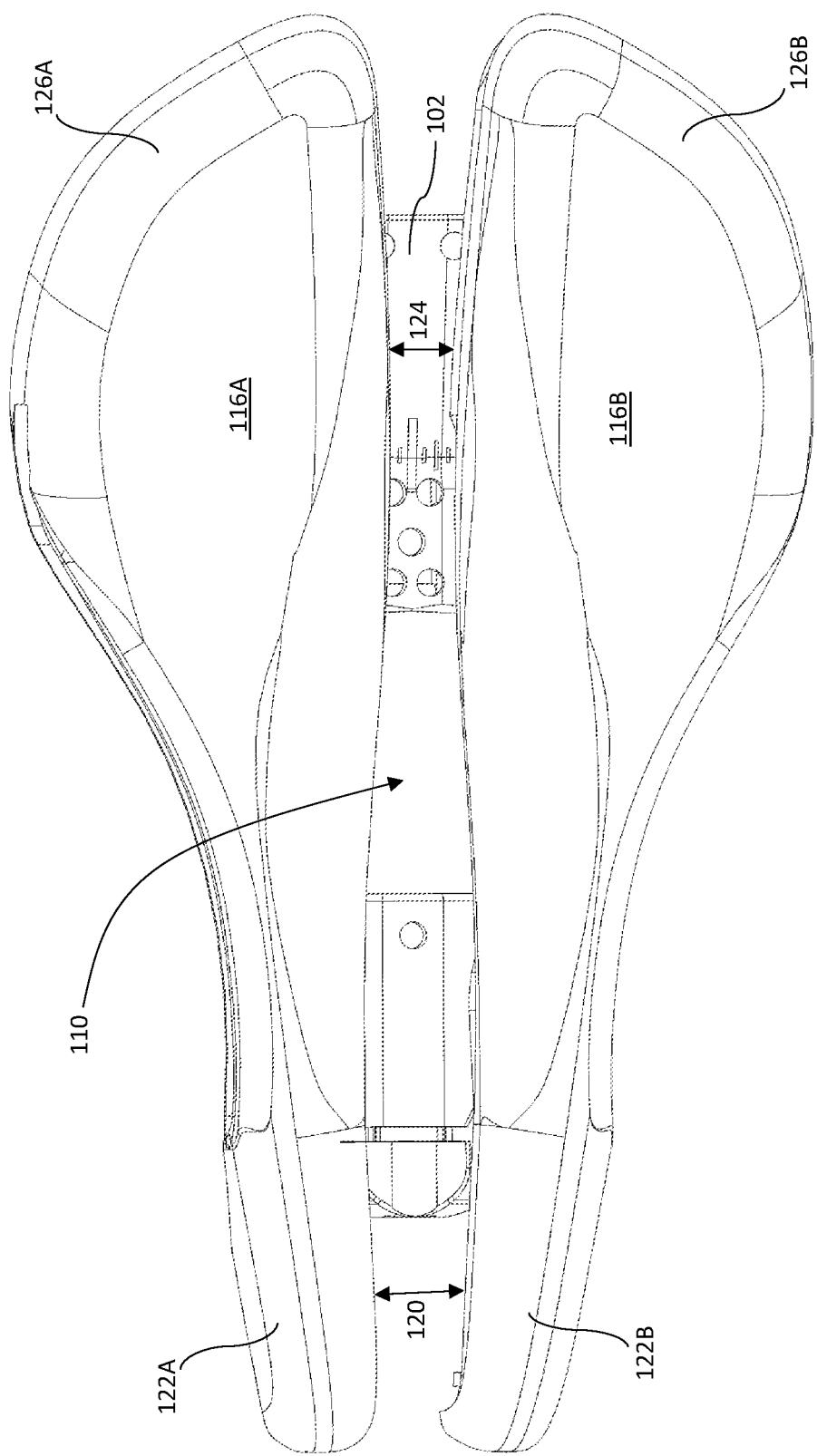
FIG. 3 illustrates a top plan view of a bicycle saddle adjustment system.
Figure 4:
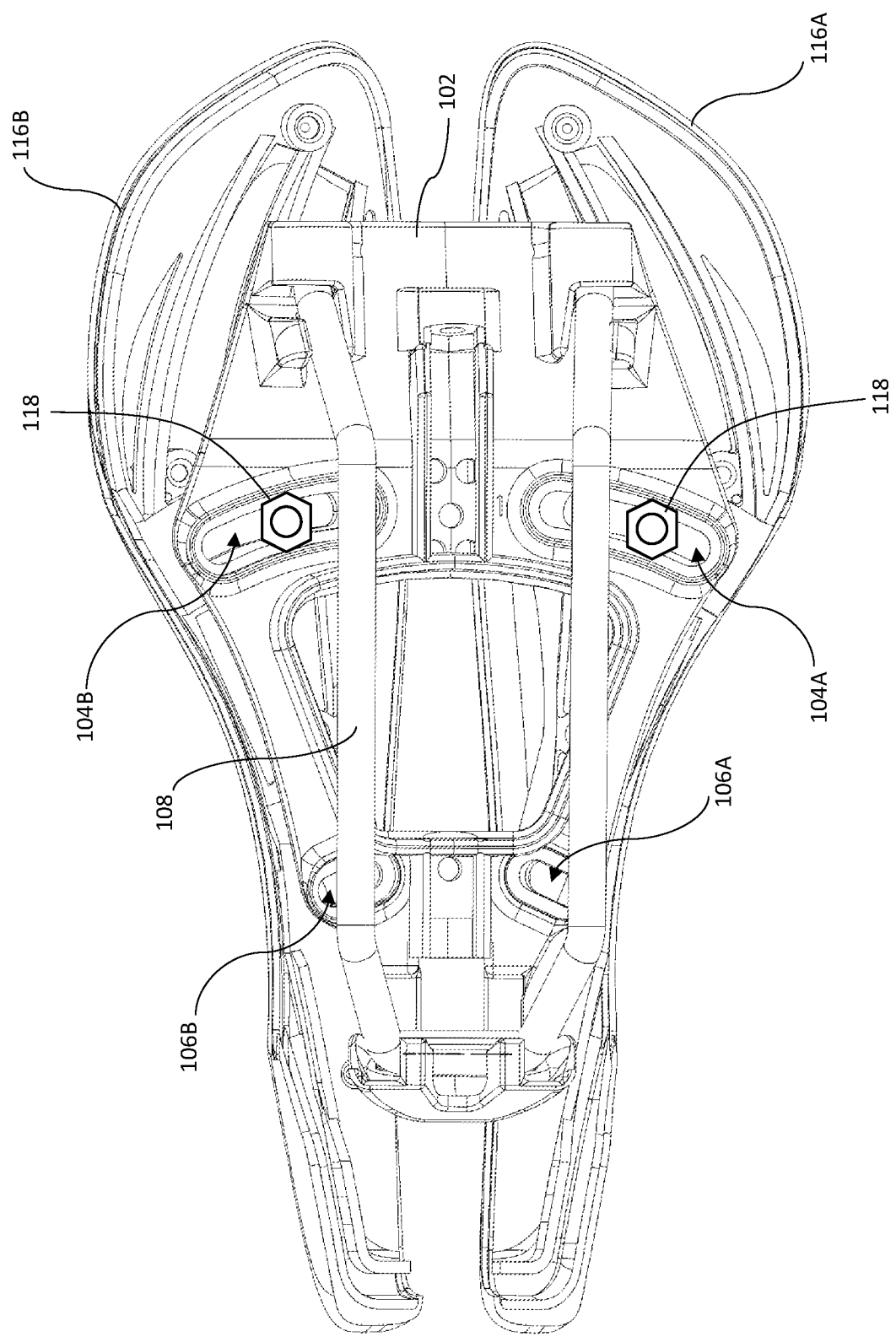
FIG. 4 illustrates a bottom plan view of a bicycle saddle adjustment system.

Accordingly, referring to FIGS. 1-4, a bicycle saddle adjustment system 100 is shown. FIG. 1 illustrates a top plan view of a base 102 having rear adjustment channels 104A, 104B and front adjustment channels 106A, 106B, rails 108 for coupling to a bicycle, quick-fit aperture 110, and securing apertures 112. The base 102 may also have measurement markings 114 (e.g., a ruler) to help identify the comfortable distance of the saddles for a user. As shown in FIGS. 2-3, one or more saddles 116A, 116B are aligned with, and couple to, the base 102, using couplers such as bolts 118 (best seen in FIG. 4). As will be appreciated, the bolts 118 may be loosened, which would allow lateral adjustment of the bolts 118 within their respective channels 104A, 104B or 106A, 106B (slidable within the channels), and therefore each saddle 116A, 116B. This allows a user to make micro or macro adjustments to the width 120 between the noses 122A, 122B as well as the width 124 between the rear 126A, 126B. This is a significant improvement over the prior art, which would require removal of the saddle from the bicycle and replacement with a different saddle having a different fitment to make adjustments. Accordingly, the bicycle saddle adjustment system 100 solves that problem by allowing a saddle set 116A, 116B to be adjusted on the base 102.

Figure 5:
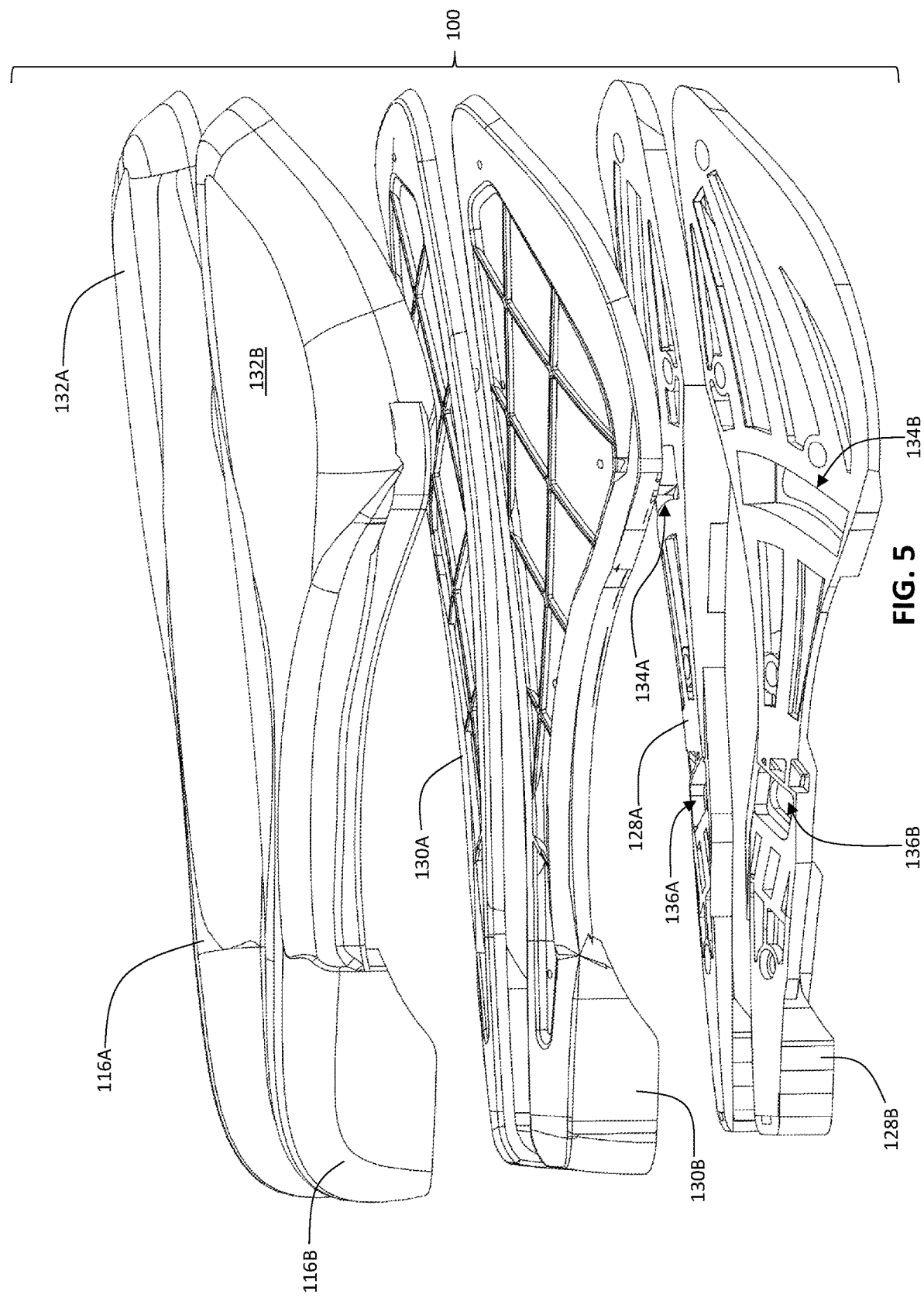
FIG. 5 illustrates a left side, decoupled elevation view of a bicycle saddle of a bicycle saddle adjustment system.
Figure 6:
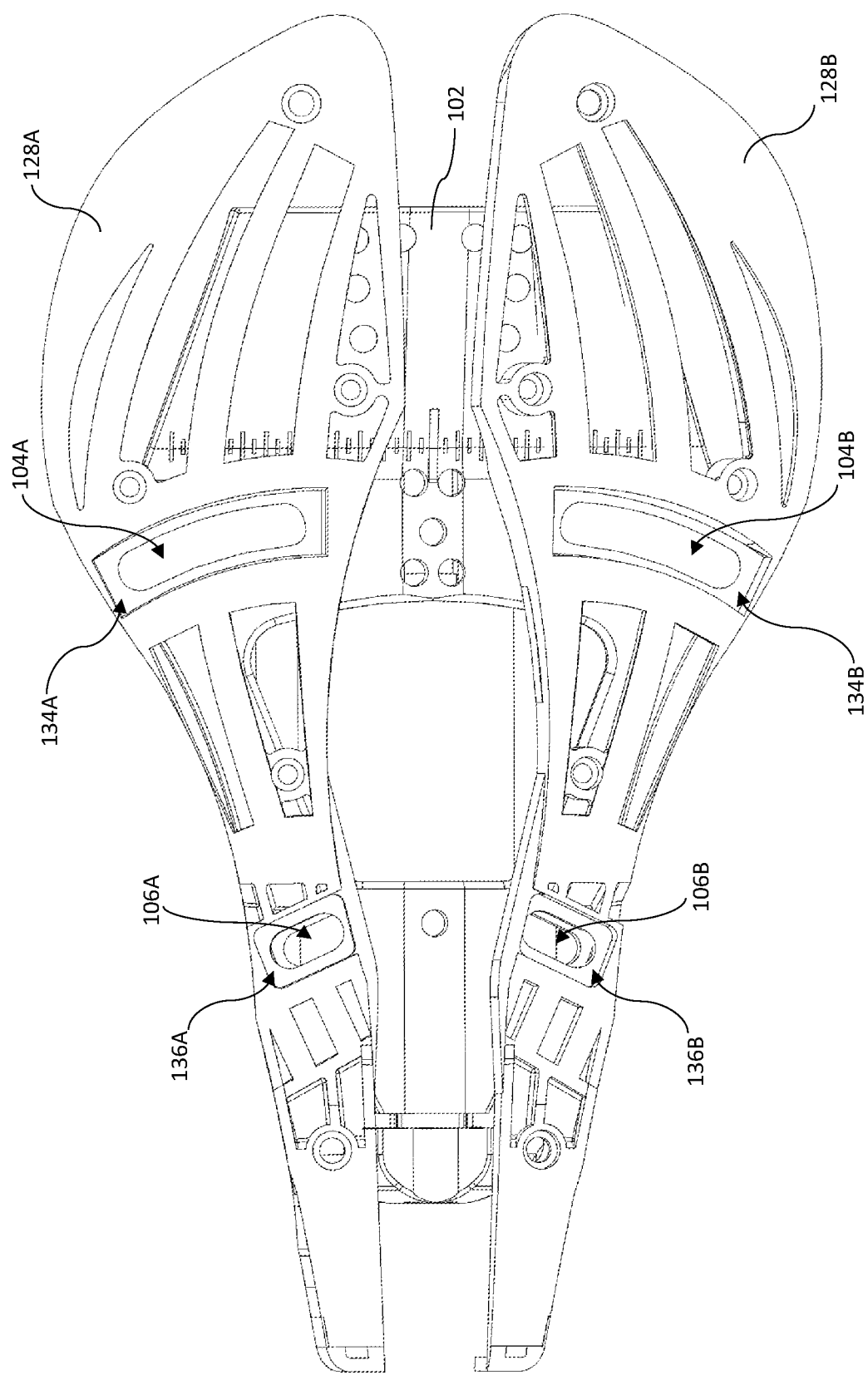
FIG. 6 illustrates a top plan view of coupling saddles and a base of a bicycle saddle adjustment system.

As shown in FIG. 5, it will be appreciated that each saddle 116A, 116B may comprise various components, such as a coupling saddle 128A, 128B, an intermediate saddle 130A, 130B, and a cushioned saddle 132A, 132B. While this configuration is shown, each saddle need not have this many layers. Indeed, the cushioned saddle 132A, 132B may comprise a hard, lower surface with fixed bolts protruding therefrom, the bolts receivable within the channels 104A-B, 106A-B. However, as shown in FIG. 6, in one embodiment, the coupling saddle 128A, 128B comprises channels 134A, 134B, 136A, 136B complementary to the rear channels 104A, 104B and front channels 106A, 106B of the base 102. The cushioned saddles 132A, 132B may then be coupled thereto. As understood, the bolts 118 (or other coupler, such as pins, screws, etc.) may then pass through the channels of the coupling saddle and the channels of the base 102, allowing lateral adjustment within the channels. However, while both the base 102 and the coupling saddles 128A, 128B are illustrated with channels, such is not required. For example, the coupling saddles need not have channels. In such an instance, an aperture could allow the bolt 118 to pass therethrough and still be laterally moveable in the channels 106A, 106B of the base.

Figure 7:
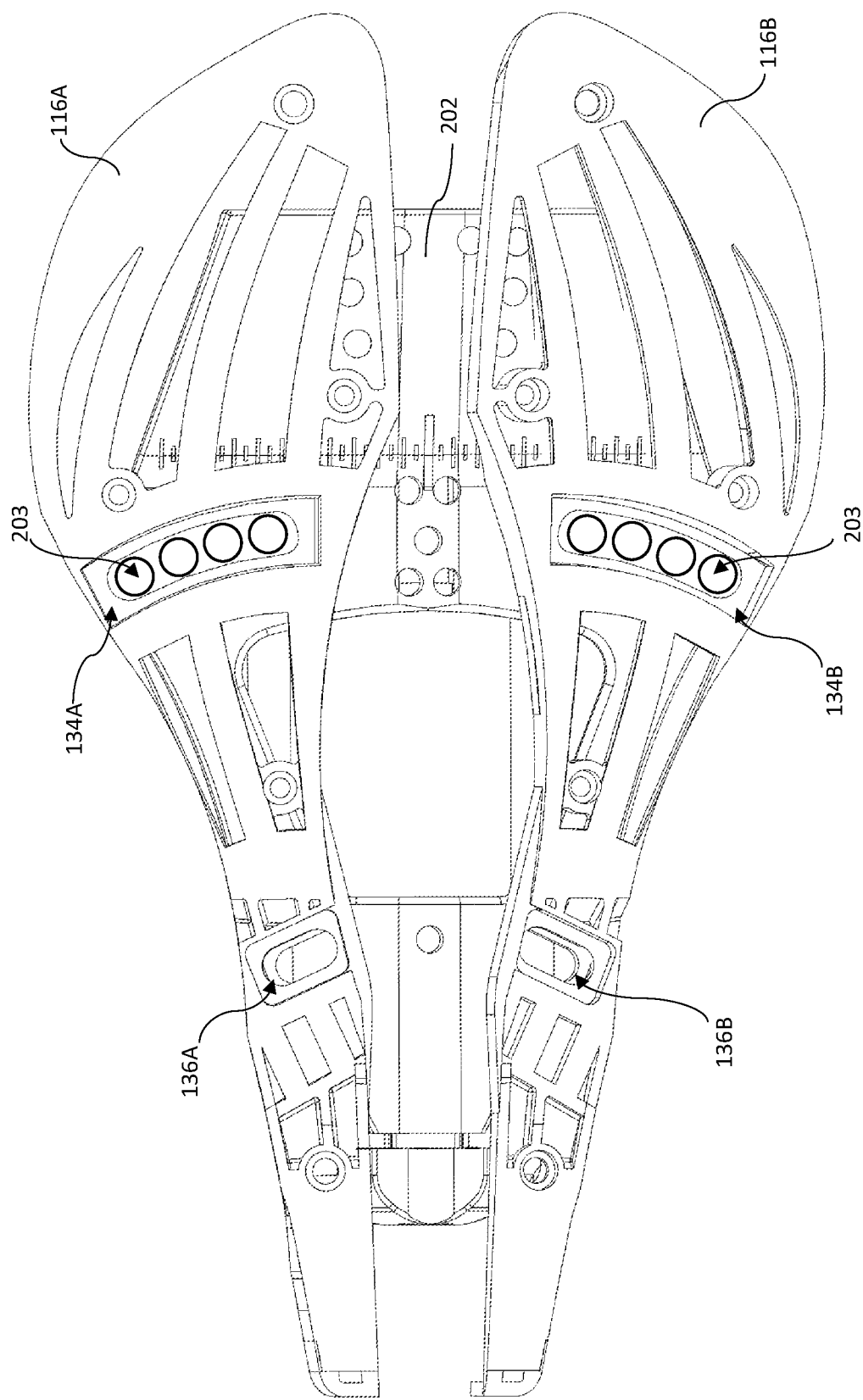
FIG. 7 illustrates a top plan view of coupling saddles and a base of a bicycle saddle adjustment system.
Figure 8:
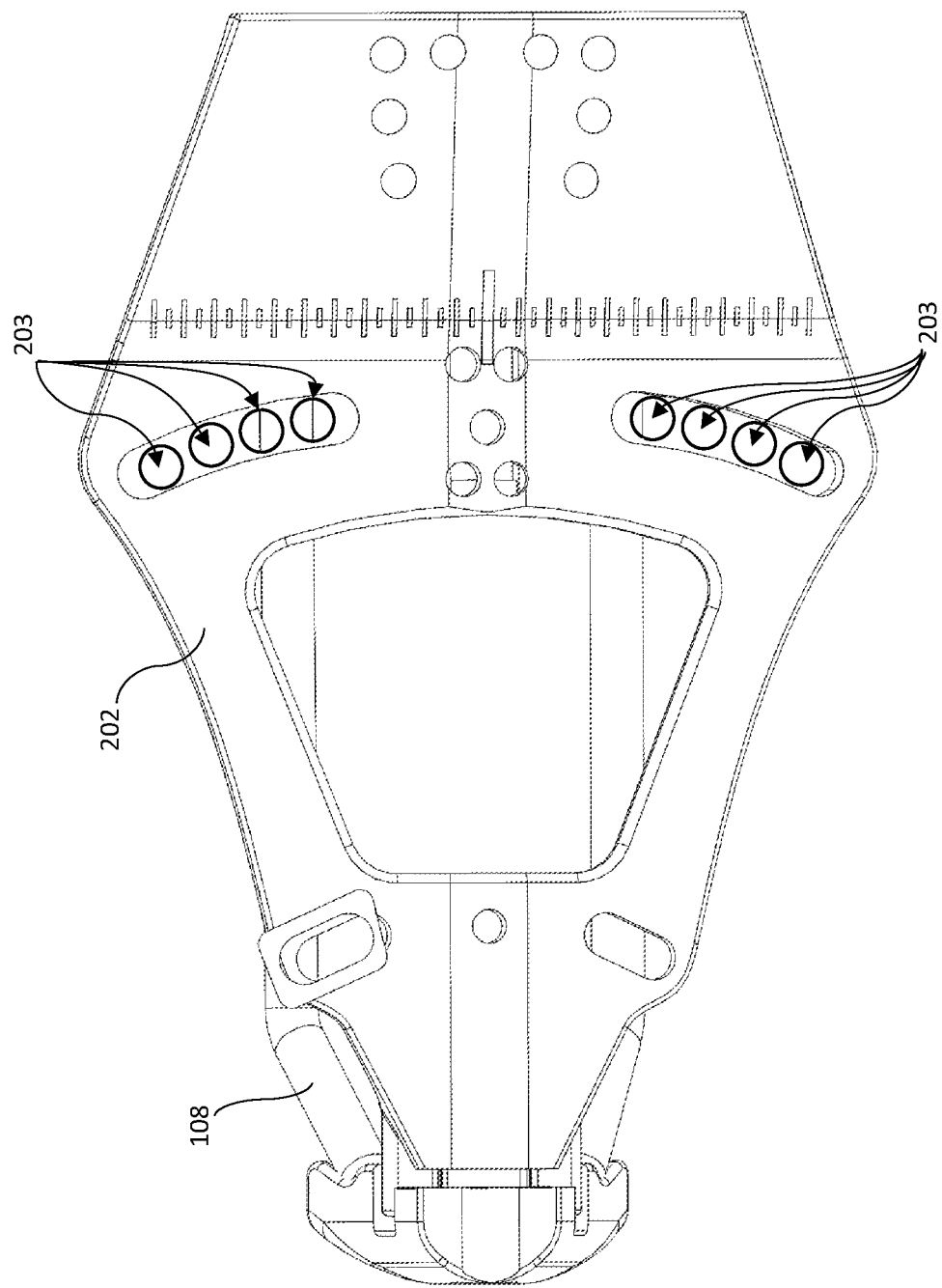
FIG. 8 illustrates a top plan view of a base of a bicycle saddle adjustment system.

While the bicycle saddle adjustment system 100 described above overcomes problems in the art, there may be circumstances where a bolt 118 in a channel 104A-B, 106A-B is not ideal. For example, the bolt 118 may loosen over time or with rough riding such as mountain biking. In such a scenario, the saddle 116A-116B may move undesirably. This may be true even if a locking nut or screw is used. Therefore, in one embodiment, it may be preferable to have one or more apertures instead of a channel. For example, referring to FIGS. 7-8, a base 202 may have a plurality of apertures 203 (instead of channels 104A-B and/or channels 106A-B). This allows each saddle 116A, 116B to be adjustable laterally in relation to the base 203, but to be secured into a predefined position. This is useful to prevent unwanted loosening and moving of the saddle 116A, 116B in a channel. In other words, the bolt 118 would pass through one of the apertures 203 to secure the saddle 116A, 116B thereto. Therefore, it will be appreciated that this overcomes limitations in the art that either do not allow for adjustment of the saddle on the base, or that allow unwanted movement when a bolt loosens.

Figure 14:
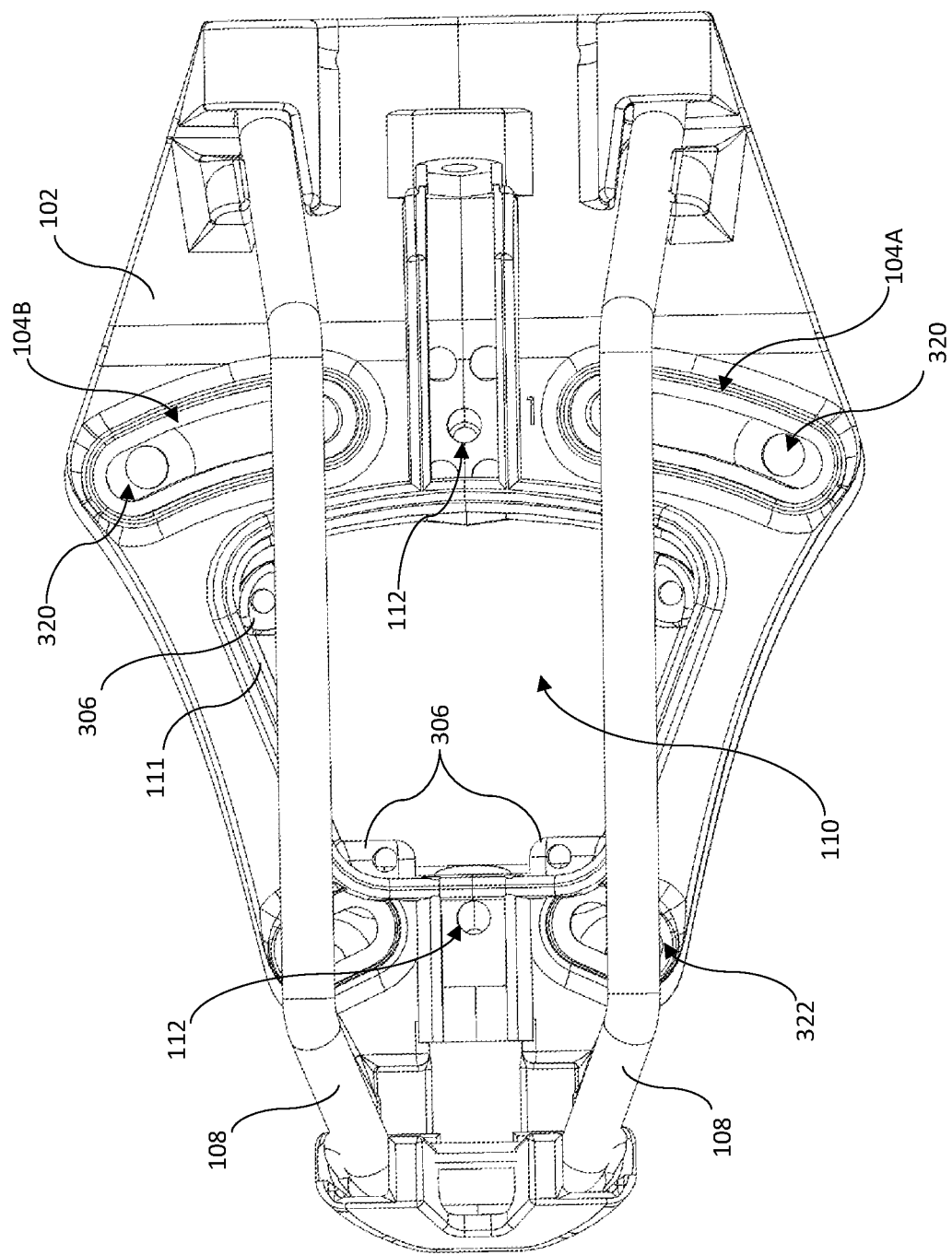
FIG. 14 illustrates a bottom plan view of a quick-fit adapter coupled to a base of a bicycle saddle adjustment system.

In one embodiment, it may be beneficial to have various quick-fit adapters for use with a base 102, 202. These adapters may allow a bike shop to quickly try several positions of the saddles without having to loosen bolts, adjust the saddles, then tighten the bolts again, and may also allow the user to try different angles (angled in relation to the ground) of saddles as well as distances apart. Therefore, referring to FIGS. 9-11, various quick-fit adapters 300, 302, 304 (also referred to as "removably attachable adapters" or simply "adapters") are illustrated. Each adapter may have securing apertures that align with the channels 104A-B, 106A-B or apertures 203, depending upon the base 102, 202 being used. Further, each base has a plurality of locking tabs 306. These locking tabs 306 allow the adapter to quickly couple (e.g., snap onto) the base 102, 202 using the perimeter of the quick-fit aperture 110 (as best shown in FIGS. 12-14). While locking tabs 306 are shown and described, it will be appreciated that other methods of removably attaching the quick-fit adapters 300, 302, 304 may be used, such as tension methods, twist and lock, cotter pins or other pins, screws, or other couplers. Other methods are shown in FIGS. 22-28 and detailed more fully herein. Accordingly, the quick-fit aperture 110 can likewise be complementary in shape, size, and position to receive the coupler from the adapter.

As shown, each adapter 300, 302, 304 may have a different formfactor. For example, adapter 300 may have a first configuration (e.g., angled top surface 308), adapter 302 may have a second configuration (e.g., rounded top surface 310), while adapter 304 may have a third configuration (e.g., a flat top surface 312). This allows a user to quickly try different angles for the saddles 116A, 116B very quickly by snapping each one onto the base 102, 202 in succession. Once the desired adapter is selected by the user, it may be secured to the base using one or more securing apertures 314 that align with the securing apertures 112 of the base 102, 202. Further, bolts 118 may pass through rear adjustment apertures 320 for aligning with the channels 104A-B, or front adjustment apertures 322 for aligning with channels 106A-B and/or apertures 203 of the selected base 202.

A quick-fit adapter 302 is shown coupled to the base 102 in FIGS. 12-14. As shown, the locking tabs 306 pass through quick-fit aperture 110 where each snapping protrusion is secured to the perimeter of the quick-fit aperture 110. To ensure coupling, the quick-fit aperture 110 may comprise a perimeter lip 111 and the locking tabs 306 may comprise a channel or lip aperture 113 for that receives the lip 111 (tongue and groove relationship). This ensures that the quick fit adapter 302 remains temporarily secured to the base 102 during fitment. Once the correct adapter 300, 302, 304 is selected, it may then be secured to the base 102, 202 using a screw or bolt through securing apertures 320 in the adapter 300, 302, 304 and securing apertures 112. However, the adapter may also be removed by decoupling (e.g., unsnapping) it from the base, as discussed later herein.

Figure 15:
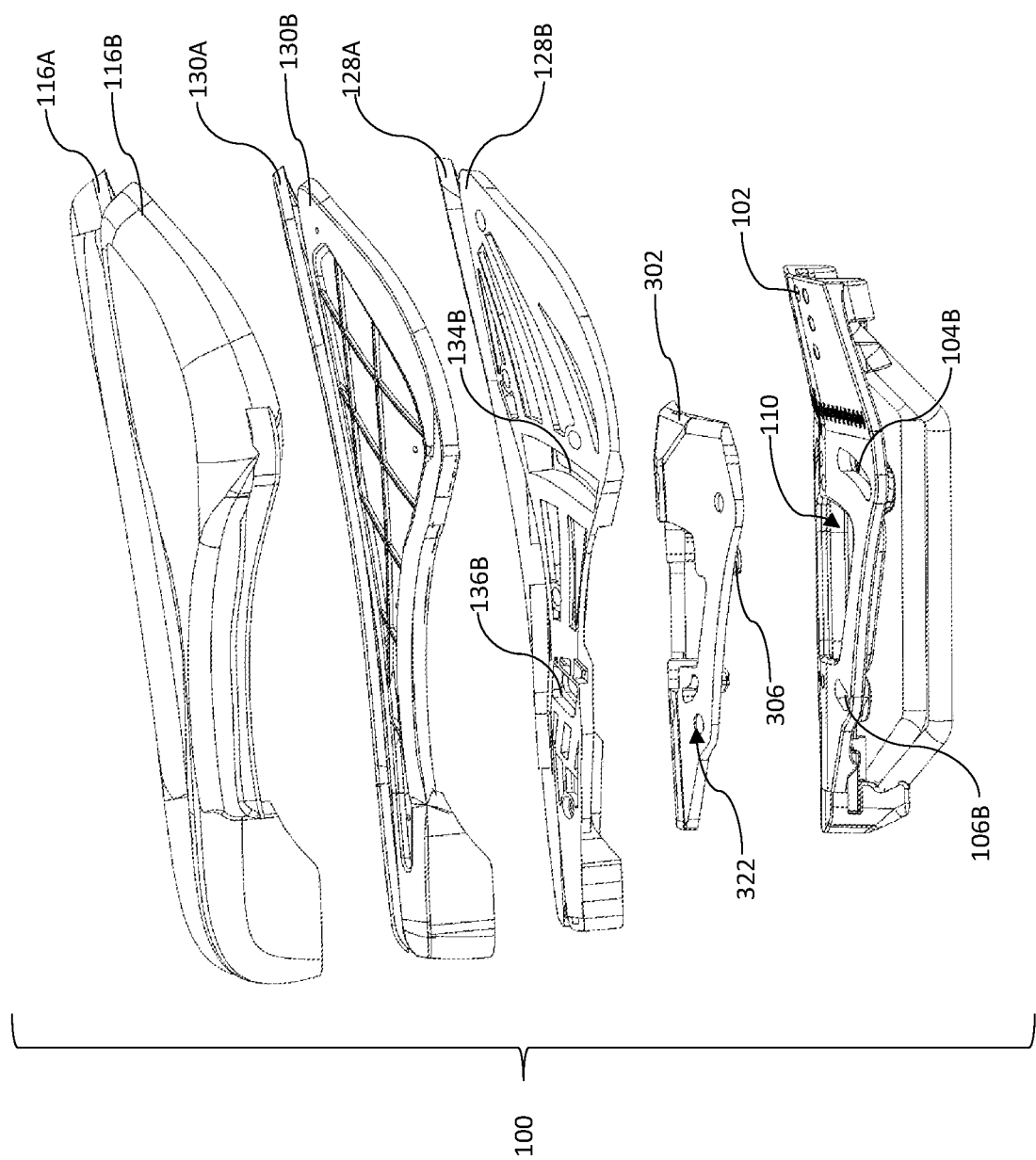
FIG. 15 illustrates a side, decoupled elevation view of a bicycle saddle adjustment system.
Figure 16:
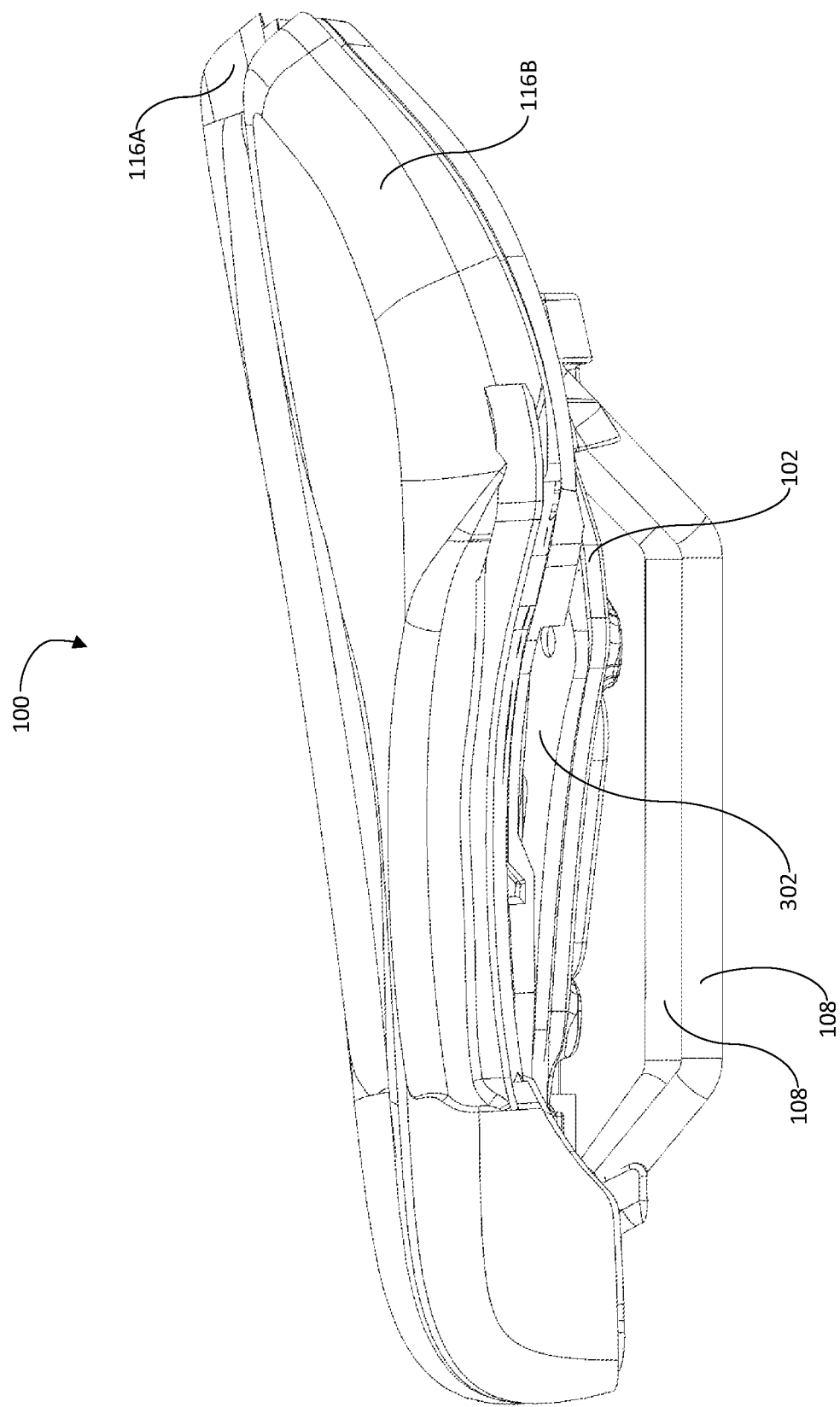
FIG. 16 illustrates a side elevation view of a coupled bicycle saddle adjustment system.
Figure 17:
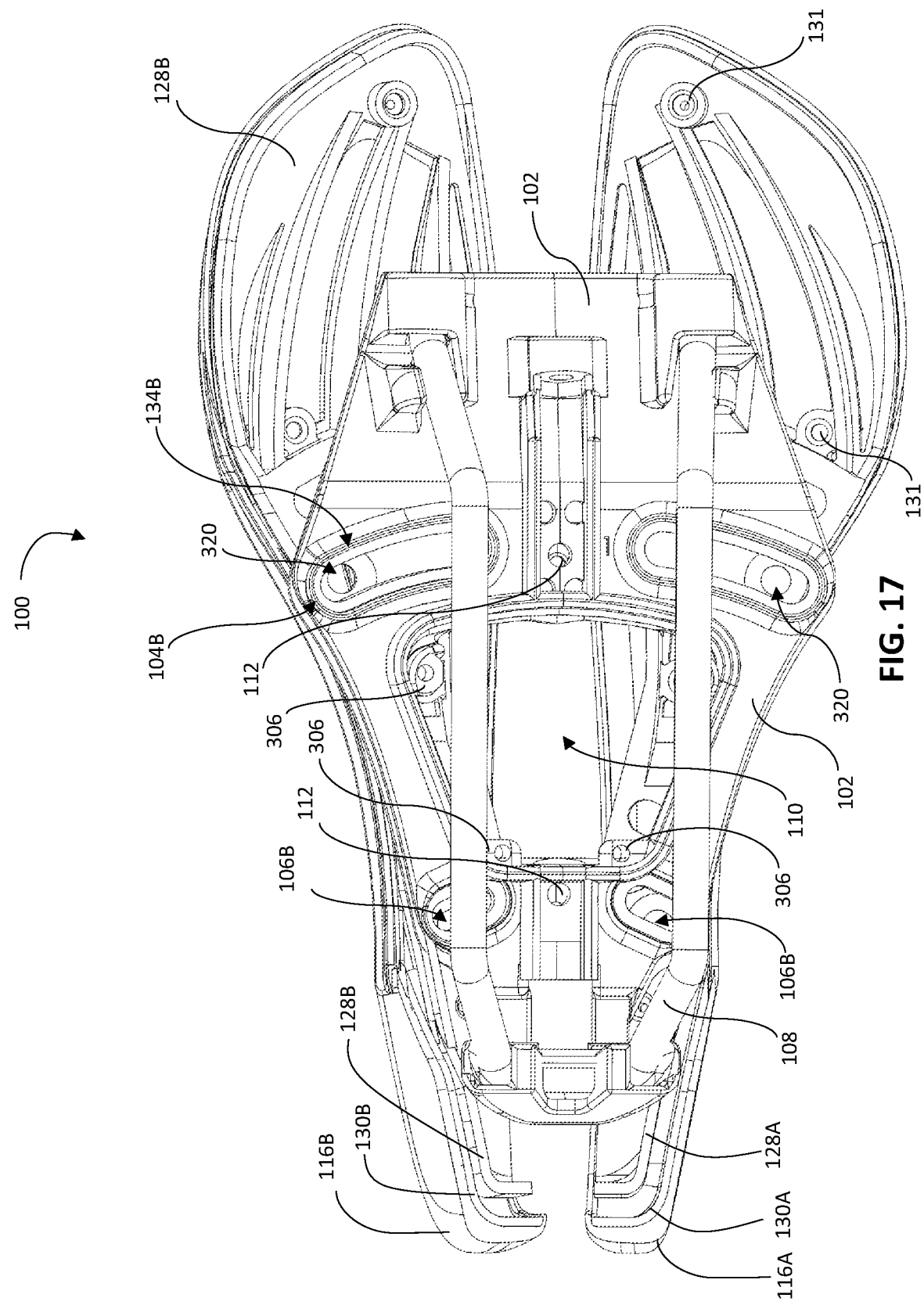
FIG. 17 illustrates a bottom plan view of a coupled bicycle saddle adjustment system.
Figure 18:
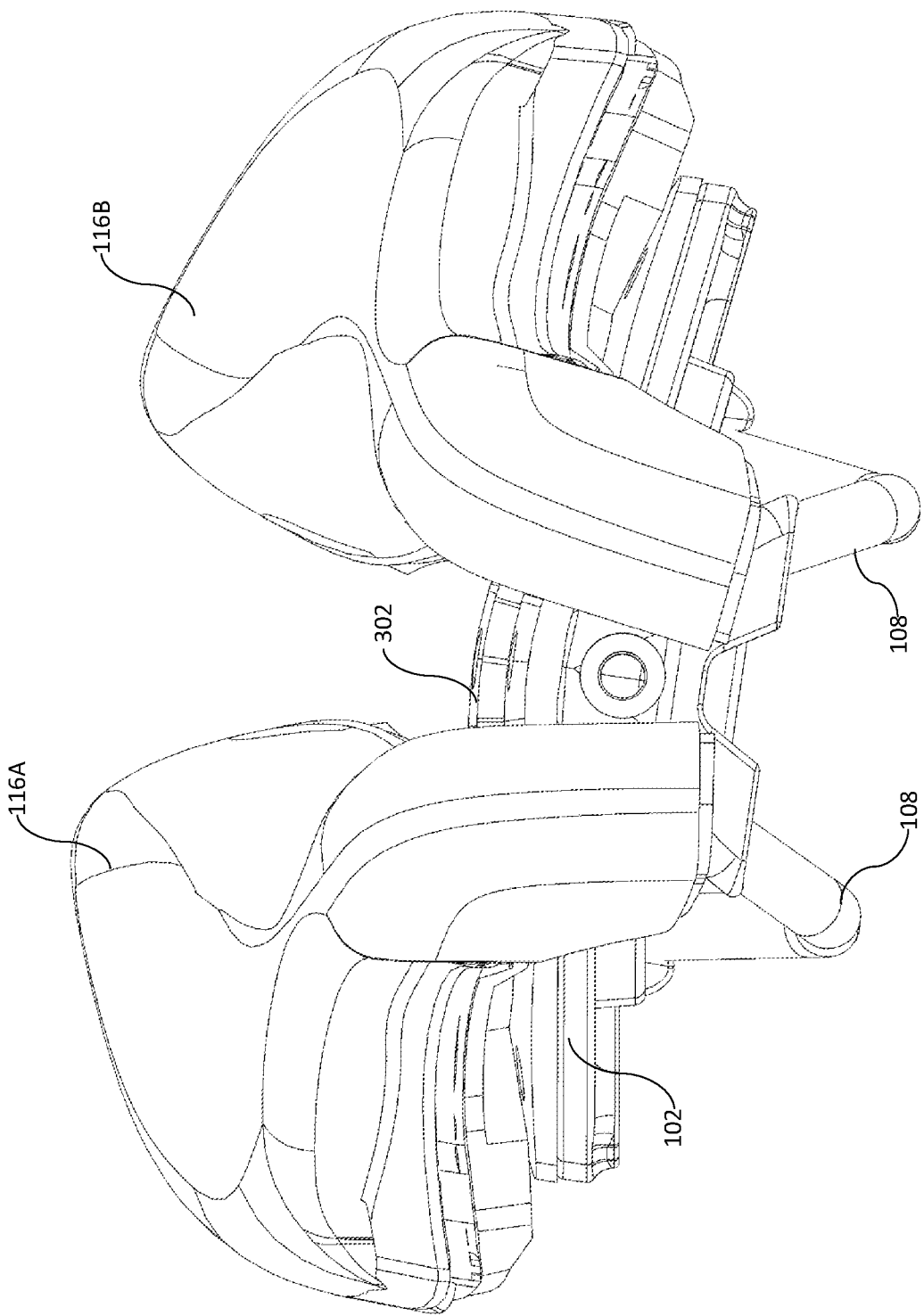
FIG. 18 illustrates a front perspective view of a coupled bicycle saddle adjustment system.
Figure 19:
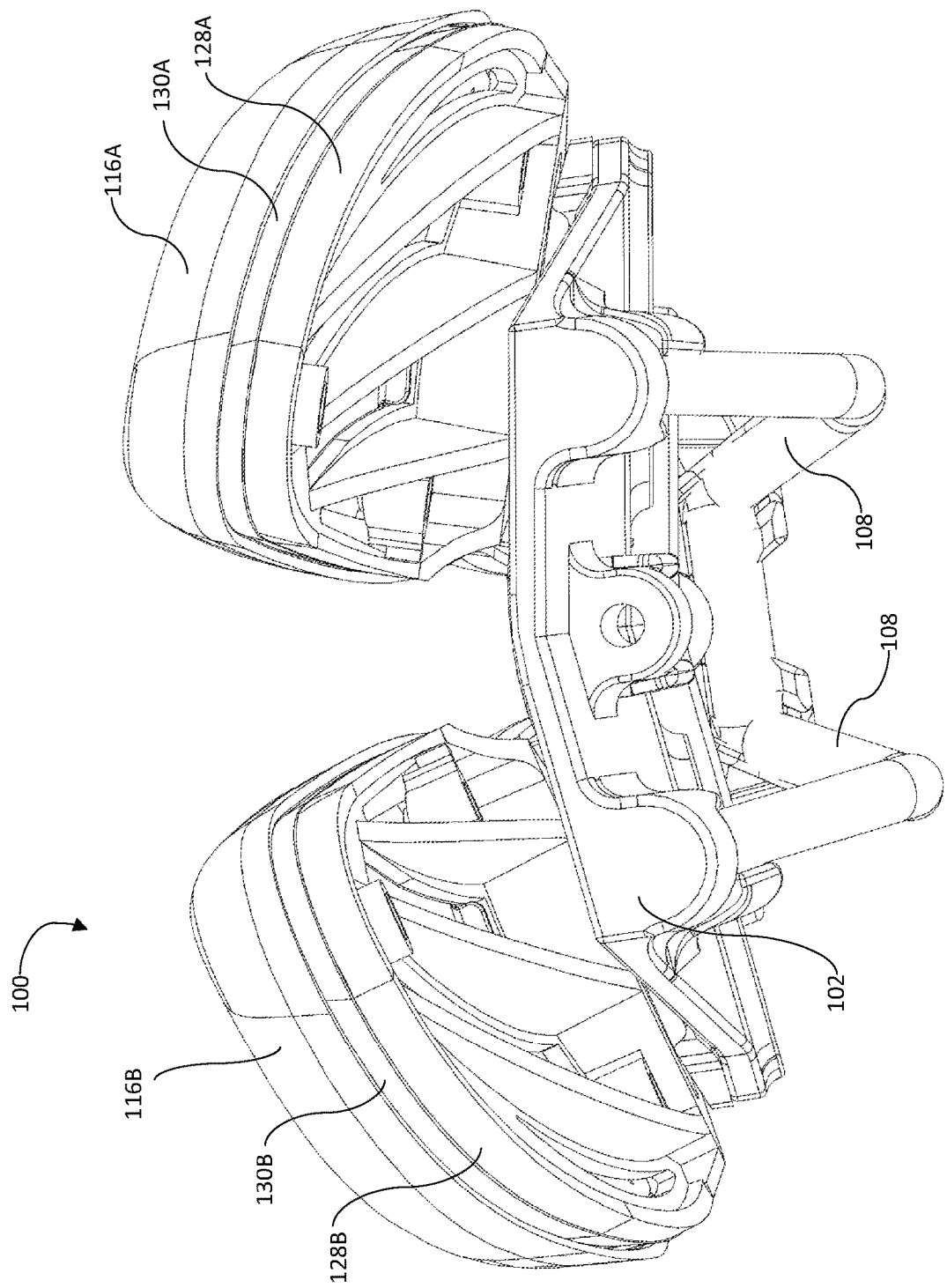
FIG. 19 illustrates a rear perspective view of a coupled bicycle saddle adjustment system.
Figure 20:
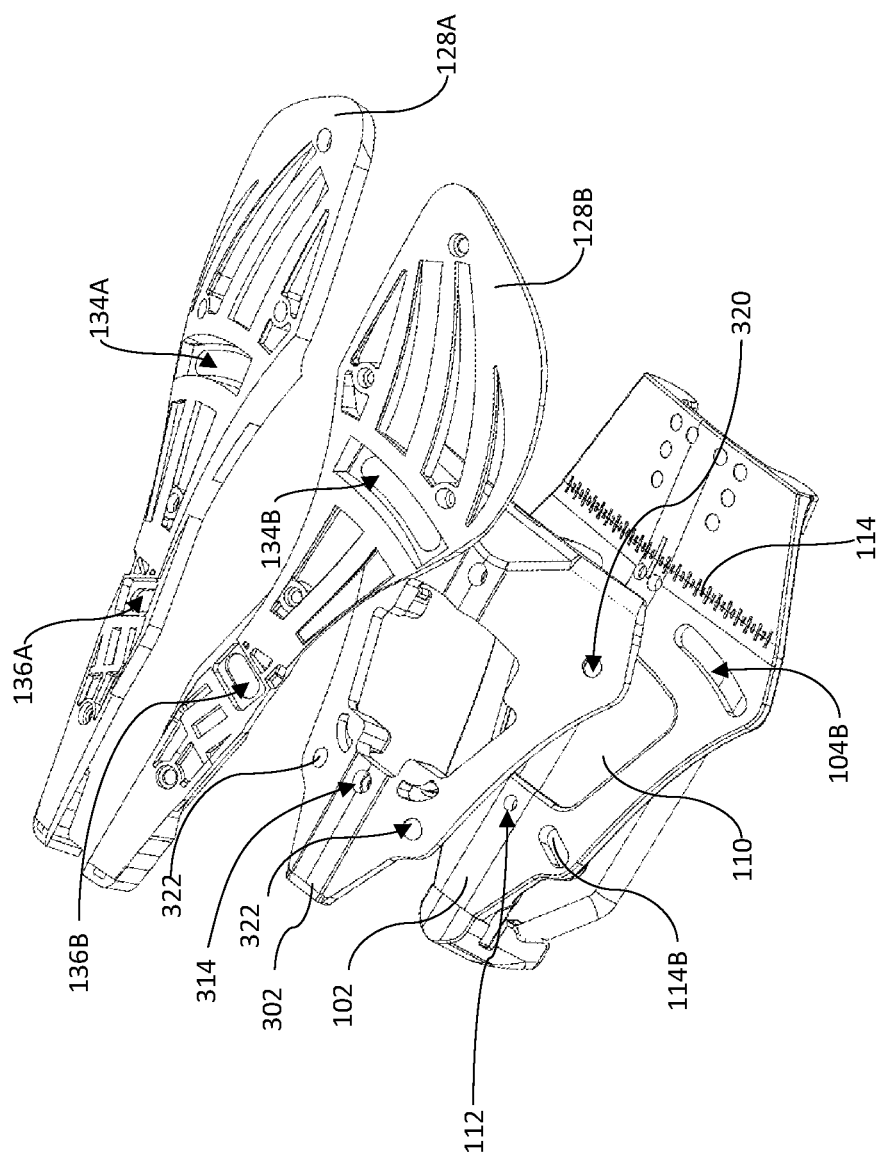
FIG. 20 illustrates coupling saddles, a quick-fit adapter, and a base of a bicycle saddle adjustment system.

As shown in FIG. 15, a bicycle saddle adjustment system 100 comprises a base 102, a removably attachable adapter 302, a first and second coupling saddle 128A, 128B, a first and second intermediate saddle 130A, 130B, and a first and second outer saddle 116A, 116B (cushioned saddle). As understood, and as shown in FIG. 15, the cushioned saddle 116A, 116B couples to the intermediate saddle 130A, 130B, which is coupled to coupling saddle 128A, 128B. The saddles may then be coupled directly to the base 102 (as discussed in earlier embodiments) or may couple to a quick-fit adapter 302, which may then be coupled ("snapped") onto the base 102 for fitment, as shown fully assembled in FIG. 16. FIG. 17 shows a bottom plan view of the bicycle saddle adjustment system 100 assembled. It will be appreciated that saddle couplers 131 (e.g., screws, bolts, rivets, pins, etc.) may be used to couple the various saddle components 116, 128, 130. FIG. 18 shows a front perspective view and FIG. 19 shows a rear perspective view of the assembled bicycle saddle adjustment 100 having an adapter (adapter not required). FIG. 20 is a disassembled view of the coupling saddles 128A-B, adapter 302, and base 102.

In one embodiment, it will also be appreciated that the removably attachable adapter 302 (or 300, 304) may be two separate components that independently couple to the first and second coupling saddles 128A, 128B, instead of a single structure as shown.

Figure 21:
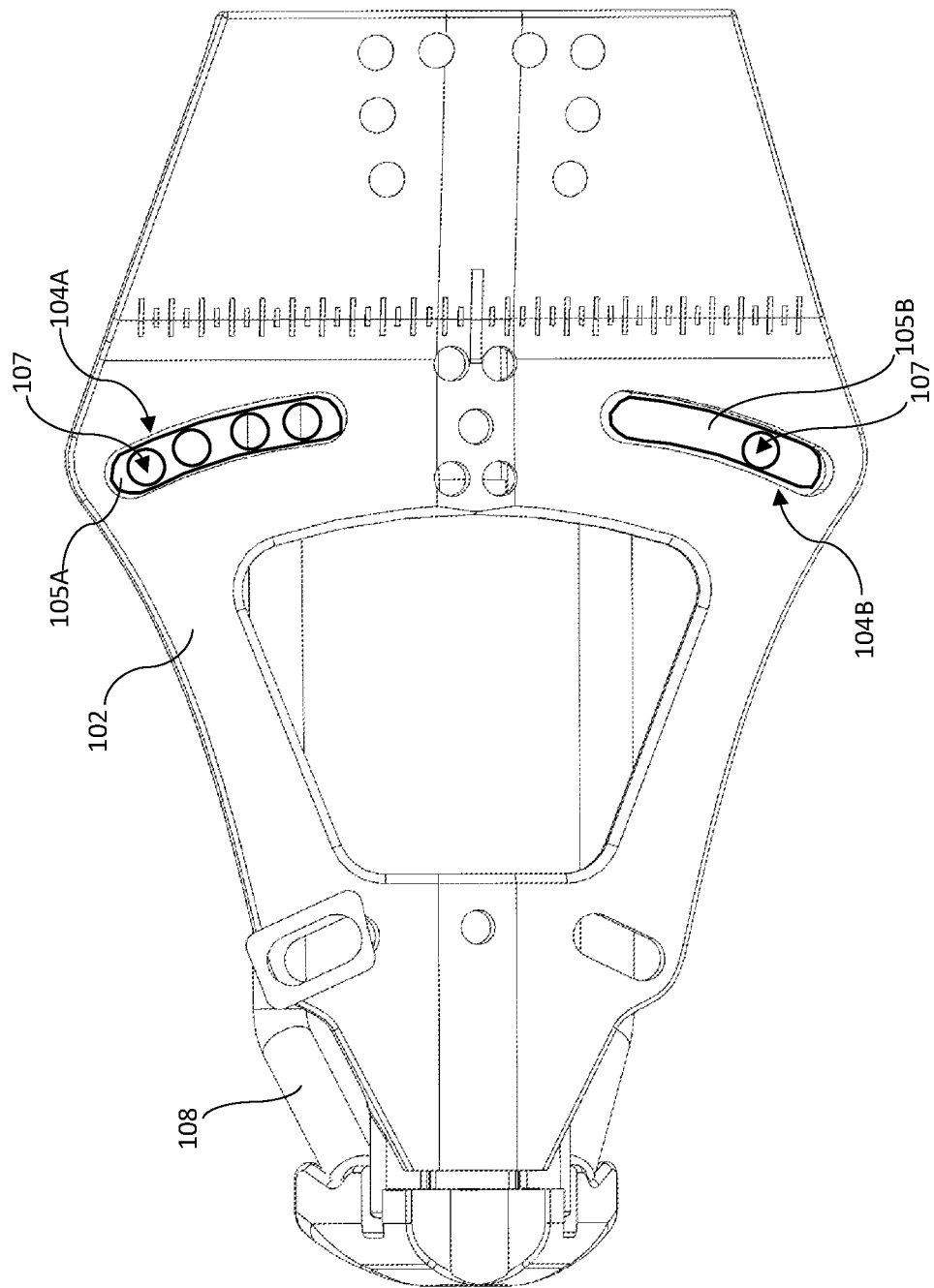
FIG. 21 illustrates a base and insert adjustment bars of a bicycle saddle adjustment system.
Figure 24:
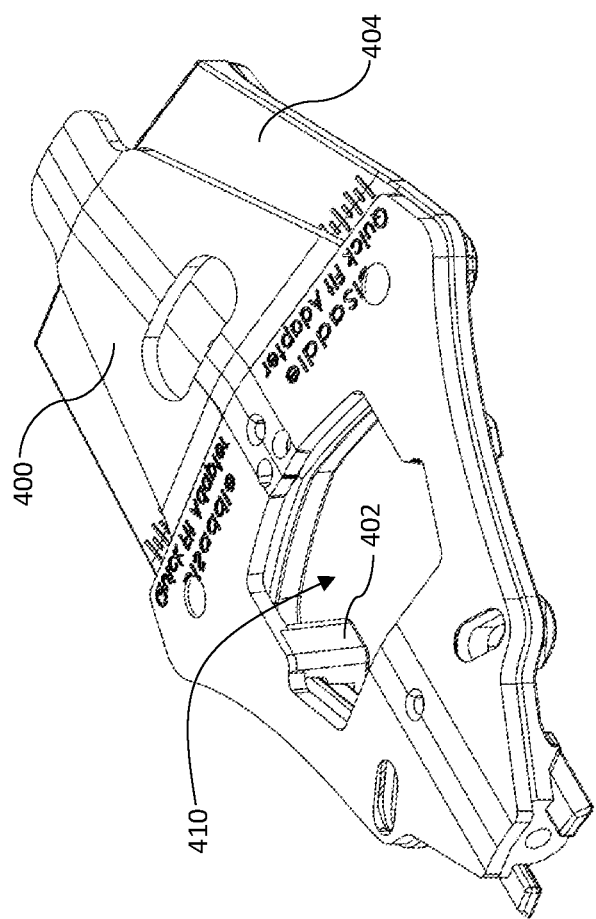
FIG. 24 illustrates a top, front perspective view of a quick-fit adapter coupled to a base of a bicycle saddle adjustment system.
Figure 25:
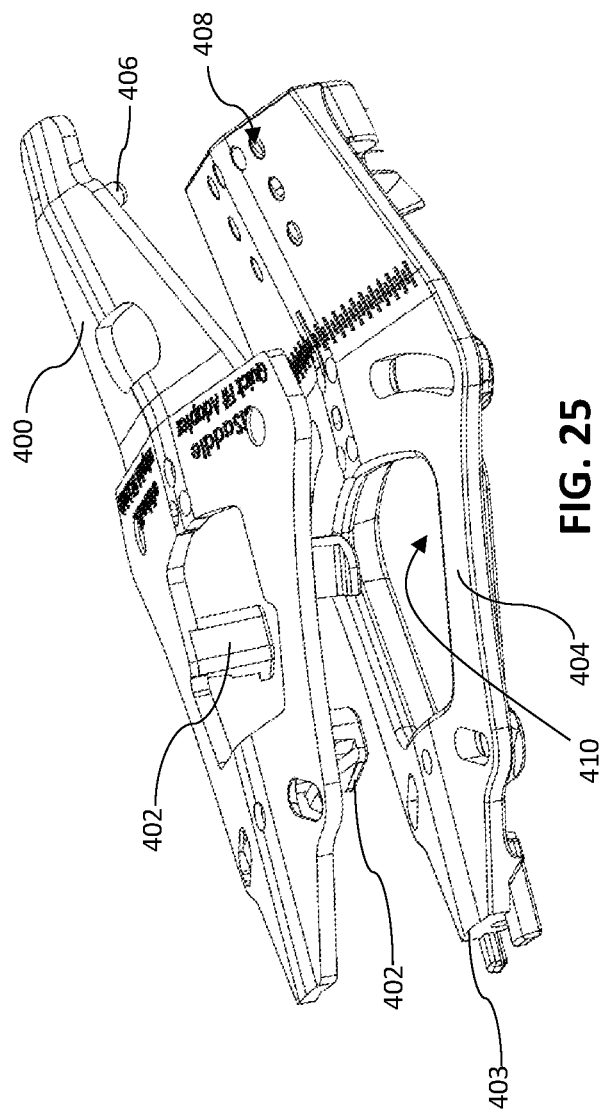
FIG. 25 illustrates a disassembled top, left side perspective view of a quick-fit adapter and base of a bicycle saddle adjustment system.

As previously discussed, a quick-fit adapter 300, 302, 304 may be used for 1) quickly determining the best general placement of saddles for a user, and 2) securing the saddles in position so that they do not experience lateral motion if bolt 118 loosens. However, it will be appreciated that once the general placement of the saddles is determined, the adapter 300, 302, 304 may be removed. In such an instance, the saddles 116A, 116B may be coupled to the base 102 by more securely fastening the bolts (e.g., adhesive), using locking screws, or by using an insert adjustment bar. For example, as shown in FIG. 21, the insert adjustment bar 105A, 105B may be sized and shaped so as to fit within the channels 104A, 104B and may comprise one or more apertures 107 where the bolt 118 may pass through (similar to apertures 203 of FIG. 7). In this way, the adapter 300, 302, 304 is not left on the bicycle, which reduces weight and cost. In one example, the insert adjustment bar is solid and an aperture 107 can be custom drilled by a shop once the ideal location for the rider has been determined using the quick fit adapter 300, 302, 304.

As discussed earlier, there are many potential methods for coupling an adapter to a base. Accordingly, a few examples are shown in FIGS. 22-28. FIGS. 22-25 illustrate a removably attachable adapter 400. The adapter 400 comprises one or more locking tabs 402 for engaging with, and coupling to, a plate 404. In addition, one or more locking protrusions 406 engage with locking apertures 408 on the plate 404. For example, the locking tabs 402 are placed within the quick-fit aperture 410 of the plate 404. The adapter 400 is then slid forward (toward nose 403), ensuring that the locking tabs 402 engage with the lip or perimeter of the quick-fit aperture 410. When positioned correctly, the locking protrusions 406 align with locking apertures 408, allowing them to be coupled, which then prohibits lateral movement of the adapter 400 on the plate 404. To remove, a user simply lifts to disengage the locking protrusions 406, then slides the adapter 400 rearwardly to disengage the locking tabs 402, allowing them to pass through the quick-fit aperture 410, thereby removing the adapter 400 from the plate 404.

Figure 26:
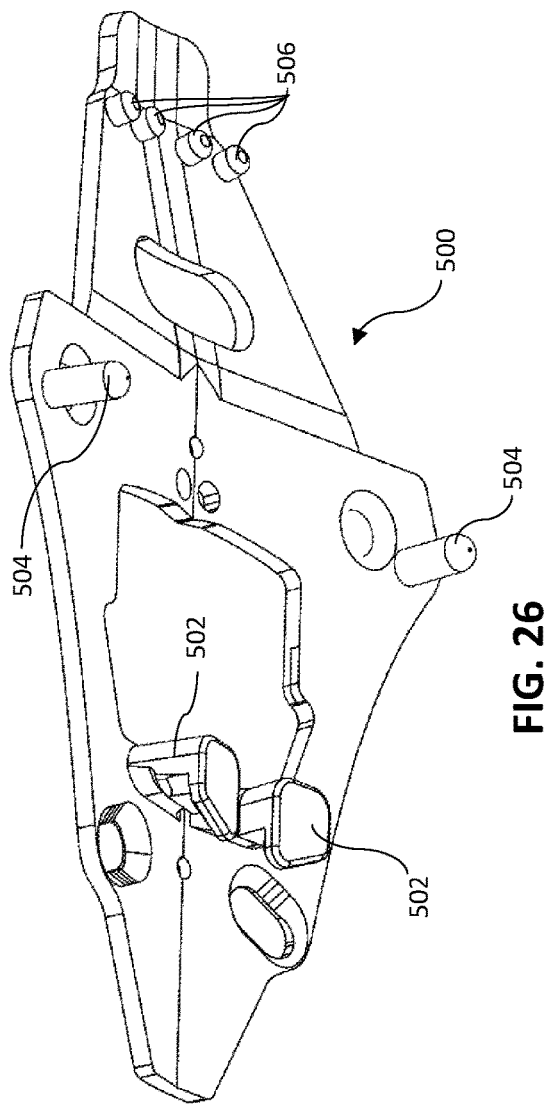
FIG. 26 illustrates a bottom, left perspective view of a quick-fit adapter of a bicycle saddle adjustment system.

FIG. 26 shows an adapter 500 in one embodiment. As shown, the adapter 500 has one or more locking tabs 502, posts 504, and locking protrusions 506. The method of coupling and decoupling this adapter is the same as described for adapter 400.

Figure 27:
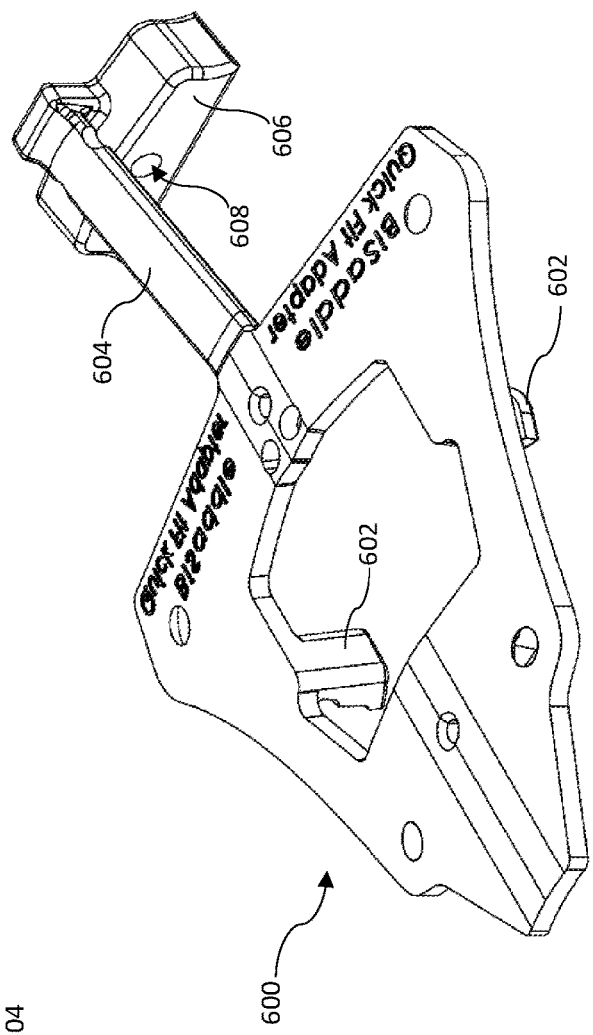
FIG. 27 illustrates a top, front perspective view of a quick-fit adapter of a bicycle saddle adjustment system.
Figure 28:
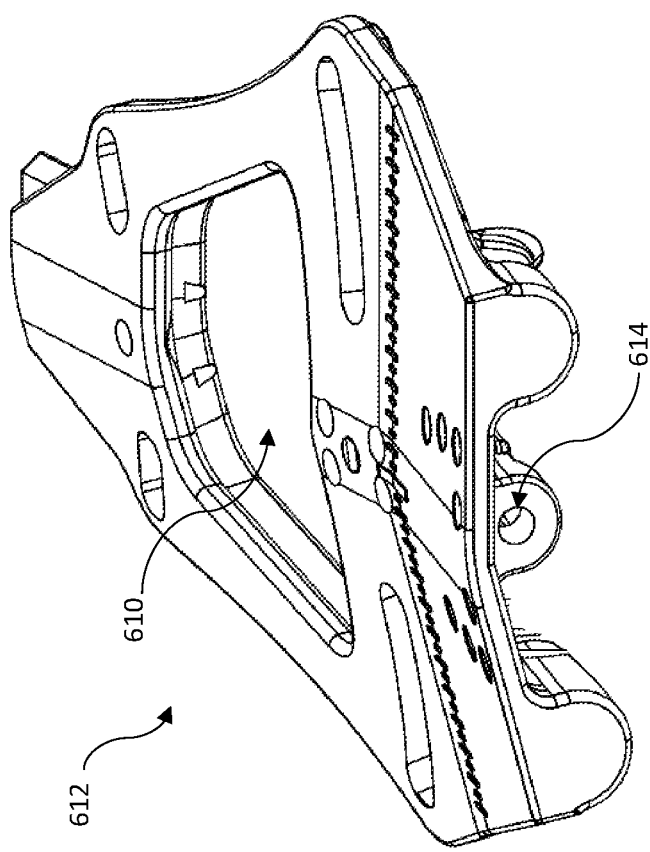
FIG. 28 illustrates a rear perspective view of a base of a bicycle saddle adjustment system.

FIG. 27 illustrates another example of an adapter 600 having one or more locking tabs 602 and a securing arm 604. The securing arm 604 has a head 606 with a locking screw aperture 608. As discussed in prior embodiments, the locking tabs 602 pass through quick-fit aperture 610 (FIG. 28) of base 612. The adapter 600 is then slid forward so that the locking tabs 602 engage the perimeter of the quick-fit aperture 610. The locking screw aperture 608 is then aligned with base locking screw aperture 614, allowing a user to secure the components together. As appreciated, this prohibits movement of the adapter 600 on the base 602.

It will be appreciated that the bases described herein may be of various types and uses. For example, the bases may be configured to mount to road bikes, mountain bikes, stationary bikes, and more. In other words, a change in configuration to fit various types of bikes is contemplated herein. It will further be appreciated that the coupling mechanism of the adapter need not be locking tabs, but may comprise numerous removably attachable methods, such as snaps, tension pins, cotter pins, hook and loop, screws, or others.

The minor adjustments possible when using the bicycle saddle adjustment system 100 provide comfort and proper fit. Because of the ability to quickly change bicycle saddles when using the removably attachable adapters 300, 302, 306, finding the proper fit takes less time and is more efficient. For example, a bike fitter could have several saddles coupled to different adapters, allowing a user to quickly try various positions without the need to remove the saddle rails 108 from the post of the bicycle. This allows fit to be much quicker, thereby saving time.

In one embodiment, the bicycle saddle adjustment system 100 further comprises a pad interposed between the adapter 300, 302, 304 and the coupling saddle 128A, 128B. This padding provides greater comfort to a cyclist, particularly when seated for extended periods of time or riding on rough terrains. While a foam padding may be desired, other types of padding may be used, such as plastics, springs, or other shock absorbing materials.

In one embodiment, a traditional type saddle can be coupled to a removably attachable adapter 300, 302, 304 by removing the rails 108 and coupling a removably attachable adapter 300, 302, 304 to the traditional saddle. This allows a user to try many bicycle saddles, whether one-piece or two-piece, to get the correct fit.

Accordingly, it is appreciated from the foregoing disclosure that the bicycle saddle adjustment system 100 solves many problems in the industry, including quick fitment and micro-adjustments.

Exemplary embodiments are described above. No element, act, or instruction used in this description should be construed as important, necessary, critical, or essential unless explicitly described as such. Although only a few of the exemplary embodiments have been described in detail herein, those skilled in the art will readily appreciate that many modifications are possible in these exemplary embodiments without materially departing from the novel teachings and advantages herein. Accordingly, all such modifications are intended to be included within the scope of this invention.

What is claimed is:

1. A removably attachable bicycle saddle system comprising:
    a base comprising:
        a first and second rear adjustment channel;
        a first and second front adjustment channel; and
        an aperture having a perimeter lip;
    an adapter comprising:
        at least one locking tab for coupling with the perimeter lip of the aperture of the base; and
        a plurality of adjustment apertures, each adjustment aperture aligning with one of the first and second rear adjustment channels, respectively, or one of the first and second front adjustment channels, respectively;
    a first saddle comprising:
        at least one coupler for passing through an adjustment aperture of the adapter and through at least one adjustment channel of the base;
    a second saddle comprising:
        at least one coupler for passing through an adjustment aperture of the adapter and through at least one adjustment channel of the base.

2. The removably attachable bicycle saddle system of claim 1, wherein the base further comprises measurement markings.

3. The removably attachable bicycle saddle system of claim 1, wherein each saddle comprises a coupling saddle, an intermediate saddle, and a cushioned saddle.

4. A removably attachable bicycle saddle system comprising:
    a base comprising rails, the base configured to couple to a bicycle via the rails;
    a plurality of adapters interchangeably couplable to the base, each adapter comprising at least one locking tab; and
    a saddle configured to interchangeably couple to each adapter.

5. The removably attachable bicycle saddle system of claim 4, wherein each adapter comprises one or more locking apertures.

6. The removably attachable bicycle saddle system of claim 4, wherein each adapter comprises a head with a locking screw aperture.

7. A removably attachable bicycle saddle system comprising:
    a base comprising at least one adjustment channel and at least one aperture, and rails, the base configured to couple to a bicycle via the rails;
    a plurality of adapters interchangeably couplable to the base, each adapter comprising a plurality of adjustment apertures, each adjustment aperture aligning with a respective adjustment channel or aperture of the base; and
    a saddle configured to interchangeably couple to each adapter.

* * * * *